Patented Apr. 10, 1934

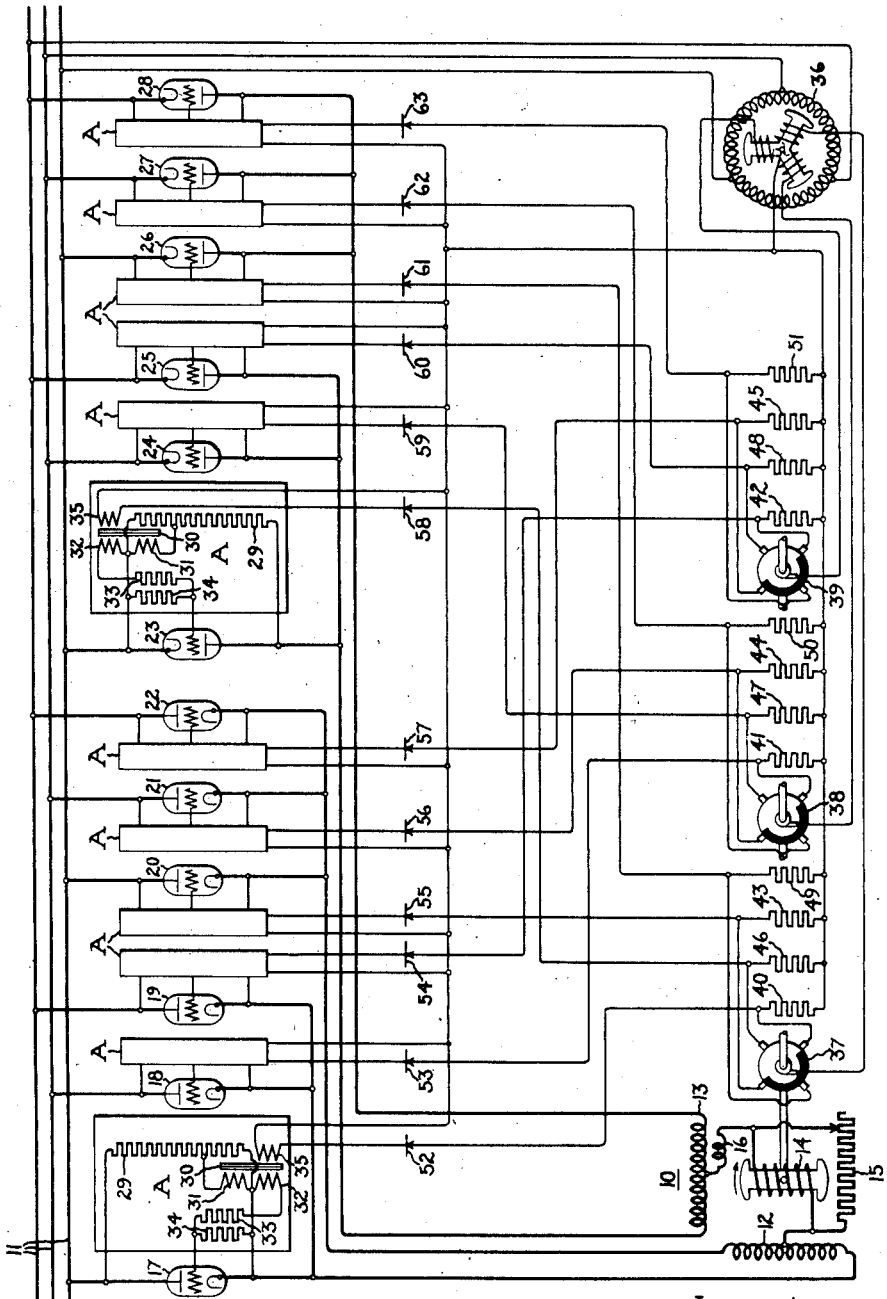

1,954,661

UNITED STATES PATENT OFFICE

1,954,661

ELECTRIC VALVE EXCITATION CIRCUITS

Ernst F. W. Alexanderson, Albert H. Mittag, and Earl L. Phillipi, Schenectady, N. Y., assignors to General Electric Company, a corporation of New York Application December 1, 1932, Serial No. 645,266

21 Claims. (Cl. 172—120)

Our invention relates to electric valve converting apparatus and more particularly to excitation circuits for the electric valves of such converting apparatus.

There are now well known in the art numerous electric valve converting apparatus for transmitting energy between direct and alternating current circuits, direct current circuits of different voltages, or independent alternating current circuits of the same or different frequencies. In the majority of these arrangements it is necessary to render the electric valves alternately conductive and non-conductive in a predetermined sequence. This is usually accomplished by impressing upon the grid of each of several electric valves an alternating potential of the proper phase relation to periodically render the valves conductive. In many of these arrangements the use of vapor electric discharge valves has been found particularly advantageous because of the relatively large amounts of energy which may be handled at ordinary operating voltages. With these valves in particular, and in some instances with valves of other types, it is highly desirable to maintain the grid of a valve at a high negative potential whenever its anode potential is positive and it is desired to maintain the valve non-conductive. In arrangements of the prior art this has been accomplished usually by the use of negative bias batteries, which are unsatisfactory from an operating standpoint. In electric valve converting apparatus suitable for transmitting energy from an alternating current supply circuit of a fixed frequency to an alternating current motor or an alternating current load circuit of a different frequency, either fixed or variable, it is generally necessary to provide grid potentials with alternating components of both the supply and the load frequencies. In certain arrangements of the prior art this has been accomplished by exciting a grid transformer from the supply circuit through a commutator device driven at the frequency of the load circuit, which, in the case of a motor load, may be driven by the motor directly. In such an arrangement, however, it has been found that the interruption of the grid excitation circuit by the commutator may, under certain conditions, produce transients in the grid circuits of the several electric valves which will render them conductive in an improper sequence.

It is an object of our invention, therefore, to provide a new and improved excitation circuit for the electric valves of an electric valve converting apparatus which will overcome the above-mentioned disadvantages of the arrangements of the prior art and which will be simple and reliable in operation.

It is another object of our invention to provide a new and improved excitation circuit for an electric valve converting apparatus which will eliminate the necessity for bias batteries or other independent sources of bias potential.

It is a further object of our invention to provide a new and improved excitation circuit for an electric valve converting apparatus including a commutator means for exciting the electric valves in a predetermined sequence which will avoid the occurrence of any undesirable transients in the grid circuits of the several electric valves and which will be particularly stable and reliable in operation.

In accordance with our invention, an electric valve converting apparatus connected to transmit energy from a source of current and including a plurality of electric valves, is provided with an excitation circuit for each of the valves including means for impressing upon the grid of the valve a potential dependent upon the instantaneous anode potential of the corresponding valve to maintain the valve in a predetermined state of conductivity; for example, the anode potential of the valve may be impressed upon the grid with an opposite polarity by means of a grid transformer, either with or without a potential divider, so that the electric valve is normally maintained non-conductive. There is also provided means in the excitation circuit for periodically overcoming the grid potential supplied from the anode circuit to change the conductive state of the valve; that is, if the valve is normally maintained non-conductive a positive grid potential is periodically impressed upon the grid to render the valve conductive at the proper instant. In accordance with another feature of our invention, the grid transformer of each electric valve is excited from a source of grid potential through a commutator device for periodically impressing a potential upon the grid to change the conductive state of the valve, and there is interposed between the commutator and the grid transformer means for suppressing from the grid positive potential impulses resulting from the interruption of the current in the excitation circuit by the commutator device.

For a better understanding of our invention, together with other and further objects thereof, reference is had to the following description taken in connection with the accompanying drawing and its scope will be pointed out in the appended claims. The single figure of the accompanying drawing illustrates an arrangement embodying our invention for operating a two-phase motor of the synchronous type at variable speed from a three-phase alternating current supply circuit of fixed frequency.

Referring now more particularly to the drawing, there is illustrated an arrangement for operating at variable speed a quarter phase motor 10 from a three-phase alternating current supply circuit 11. The motor 10 may be of any of the several types well known in the art, although we have illustrated, by way of example, a motor of the synchronous type comprising the phase windings 12 and 13 and a rotatable field winding 14. The field winding 14 may be connected in series with the armature windings as illustrated, in case it is desired to give the motor series characteristics, or in case shunt characteristics are desired, the field winding may be separately excited in any well-known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed-torque characteristics of the motor, in which case it is preferable also to include a reactor 16 in series with the parallel connected winding 14 and resistor 15. The terminals of the armature phase winding 12 are connected to the several phases of the supply circuit 11 through two groups of similarly connected electric valves 17, 18 and 19, and 20, 21 and 22, respectively. Similarly, the armature phase winding 13 is connected to the supply circuit 11 through two groups of electric valves 23, 24 and 25, and 26, 27 and 28, connected to the circuit 11 with a polarity opposite to that of the electric valves 17-22, inclusive. Each of the electric valves 17-28, inclusive, is provided with an anode, a cathode, and a control grid, and may be of any of the several types well known in the art, although we prefer to use valves of the vapor electric discharge type.

In order to maintain said valves normally in a predetermined state of conductivity, an excitation circuit A is provided for each of the several electric valves. This circuit comprises a potential divider 29, illustrated as a resistance potentiometer, connected between the anode and cathode of the valve and a grid transformer 30 provided with a primary winding 31 energized with a portion of the potential across the potentiometer 29, and with a secondary winding 32 connected between the grid and cathode of the valve through a current limiting resistor 33. A stabilizing resistor 34 is also preferably connected directly between the grid and cathode of the valve to stiffen the grid circuit. By properly selecting the polarity of the windings 31 and 32 the grids of the valves may be maintained either negative whenever the anode of the valve is positive to maintain the valve non-conductive, which is the preferred arrangement, or positive whenever the anode of the valve is positive to maintain the valve normally conductive. The grid transformer 30 is also provided with an additional primary winding 35 periodically to overcome the potential impressed from the potential divider 29 and render the valves conductive or non-conductive, as the case may be, in the proper sequence.

In order selectively to render the several electric valves 17-28, inclusive, conductive in a predetermined sequence, the windings 35 of the grid transformers 30 are energized from the alternating current circuit 11 through a rotary phase shifting transformer 36 and the commutator devices 37, 38 and 39. For example, the windings of the grid transformers associated with the valves 17-28, inclusive, are energized from the potentials across the resistors 40-51, inclusive, respectively, the connections being such that each of the commutators 37, 38 and 39 are energized from one phase of the rotary phase shifting transformer 36 and the resistors energized through each of the commutators control the electric valves associated with the corresponding phase of the supply circuit 11, while the several groups of valves 17—18—19, 20—21—22, etc., connected to the several terminals of the armature windings 12 and 13 of the motor 10 are excited from the brushes of the commutators 37, 38 and 39 of the same phase relation. As is well understood by those skilled in the art, the rotary phase shifting transformer 36 is effective to vary the phase relation between the potential supplied to the grids of the several valves by the windings 35 and the corresponding anode potentials of the valves to vary the average impedance of the valves. Unilaterally conductive devices, such as the contact rectifiers 52-63, inclusive, are preferably included in series with the windings 35 of the grid transformers of the valves 17-28, inclusive, respectively, to prevent the occurrence of certain transients resulting from the interruption of current in the excitation circuit by the commutator devices 37, 38 and 39, as explained in more detail hereinafter.

The general principles of operation of the above-described apparatus for transmitting energy from the alternating current circuit 11 to the motor 10 will be well understood by those skilled in the art, or will be found explained in detail in a copending application of E. F. W. Alexanderson, Serial No. 598,380, filed March 12, 1932, and assigned to the same assignee as the present application. That application discloses and broadly claims the above described power circuit as well as the feature of selectively energizing the grids of the several electric valves from a source of alternating potential through a commutating device. The copending application of E. F. W. Alexanderson, Serial No. 638,361 filed March 12, 1932, entitled "System of distribution" and assigned to the same assignee as the present application discloses and broadly claims the features of an alternating current motor connected to a source of current through a plurality of electric valves, the grids of which are selectively energized through a commutating device driven by the motor. Assuming that the motor field 14 and the commutators 37, 38 and 39 are substantially in the position illustrated, and that the rotary phase shifting transformer 36 is so adjusted that the potentials impressed upon the several groups of resistors through their associated commutators are substantially in phase with the anode potentials of the valves controlled by the respective commutators, it will be seen that the windings 35 of the grid transformers associated with the groups of valves 17, 18 and 19, and 23, 24 and 25, are excited from their respective resistors 40, 41 and 42, and 46, 47 and 48. These two groups of valves 17, 18 and 19 and 23, 24 and 25, comprise a three-phase full-wave rectifying circuit of which the load circuit comprises the lower half of the motor armature winding 12, the field winding 14, reactor 16, and the left-hand portion of the motor armature winding 13. The resultant motor field created by current flowing in the armature windings 12 and 13 will be in such a direction as to cause a torque upon the motor field 14 and initiate rotation of the motor, which, it will be assumed, is in a clockwise direction as indicated by the arrow. When the motor 10 has rotated through approximately 90 electrical degrees, the resistors 46, 47 and 48 will be deenergized and the resistors 49, 50 and 51 will be energized by their respective commutators. The result is that the group of valves 23, 24 and 25 becomes non-conductive and the group of valves 26, 27 and 28 becomes conductive to transfer the current from the left-hand portion to the right-hand portion of the armature winding 13. The armature field of the motor 10 is thus advanced 90 electrical degrees and a torque is produced on the motor field 14 to rotate it through an additional 90 degrees. In this manner, current is successively commutated between the several terminals of the armature windings 12 and 13 to produce a rotating armature field and a rotation of the motor 10. The commutator devices 37, 38 and 39 serve to excite only those valves connected to the terminals of the armature windings which are in a torque producing position with respect to the motor field 14 at the particular instant.

As is well understood by those skilled in the art, the average voltage impressed upon the armature windings 12 and 13 may be reduced under starting conditions by retarding the phase of the potentials applied to the grid transformer windings 35 by means of the rotary phase shifting transformer 36, an operation well known in the art. By gradually advancing the phase of the grid potentials by the rotary phase shifting transformer 36, the average voltage impressed upon the motor 10 may be increased to increase the speed of the motor. Additional speed control may be obtained by adjusting the variable resistor 15 connected in parallel with the field winding 14. With the above-described arrangement, the motor 10 will be given speed torque characteristics similar to those of a direct current series motor.

Our improved excitation circuit described above is effective to insure that each of the several electric valves is maintained non-conductive except during those intervals during which a positive potential impulse is supplied by its associated grid transformer winding 35. For example, considering electric valve 17, if the anode potential is positive, a positive potential is impressed upon the primary winding 31 of the grid transformer 30 by means of the potentiometer 29. This potential is impressed upon the grid of the valve 17 with a reverse polarity through a current limiting resistor 33. The resistor 34 connected directly between the grid and cathode is for the purposes of stabilizing or stiffening the grid circuit, that is, establishing a definite impedance of the grid circuit, which might become indefinite during those intervals in which no current is flowing in the grid-cathode circuit of the valve. When the anode potential of the electric valve 17 is negative, a positive potential will be impressed upon the grid by the grid transformer 30, but this positive potential is ineffective to render the valve conductive because of its unilateral conductivity characteristics which prevent it from conducting whenever its anode is negative. Hence, each of the several electric valves is continuously maintained non-conductive as described above, except during those intervals when its associated grid transformer winding 35 is excited to impress a positive potential on its grid.

It has been found that, with the above arrangement, if the commutator associated with one of the windings 35 interrupts the current in this circuit during the portion of the half cycle of alternating potential when it is of the proper polarity to excite the grid of the associated valve with a negative potential, this sudden interruption of current in the circuit of the winding 35 produces a reversal in the potential supplied by the winding 32 of the grid transformer, due to the fact that the flux of this transformer tends to maintain the exciting current; that is, under such conditions, the grid of an electric valve may be excited with a positive potential when it should be maintained negative. In order to prevent the occurrence of such conditions, unilaterally conductive devices, such as the contact rectifiers 52–63, inclusive, are included in series with the several grid transformer windings 35, and so connected as to suppress the negative half cycles of the alternating potential supplied from the rotary phase shifting transformer 36 through the commutator devices 37, 38 and 39. If a commutator should interrupt the current in the grid excitation circuit during a half cycle of alternating potential such as normally renders the grid of a valve positive, no harmful results will occur, since the transient voltages produced by the flux in the grid transformer will be such as to impress a negative potential upon the grid of the electric valve. Such negative grid transients produce no harmful results, particularly when utilizing valves of the vapor electric discharge type.

While we have illustrated our invention as embodied in an arrangement for operating a dynamo-electric machine at variable speed from an alternating current source of fixed frequency, we wish it to be understood that our improved grid excitation circuit is of general application in electric valve converting apparatus for transmitting energy between direct and alternating current circuits, direct current circuits of different voltages, or alternating current circuits of the same or different frequencies.

While we have described what we at present consider the preferred embodiment of our invention, it will be obvious to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. In an electric valve converting apparatus for transmitting energy from a source of current through a plurality of electric valves each provided with an anode, a cathode, and a control grid, a grid excitation circuit for each of certain of said valves comprising means for impressing on the grid a potential dependent upon the instantaneous anode potential of the corresponding valve to maintain said valve normally in a predetermined state of conductivity, and means for periodically overcoming said grid potential to change the conductive state of said valve.

2. In an electric valve converting apparatus for transmitting energy from a source of current through a plurality of electric valves each provided with an anode, a cathode, and a control grid, a grid excitation circuit for each of certain of said valves comprising means for impressing on the grid a potential derived from the potential of the anode of the corresponding valve to maintain said valve normally in a predetermined state of conductivity, and means for periodically overcoming said grid potential to change the conductive state of said valve.

3. In an electric valve converting apparatus for transmitting energy from a source of current through a plurality of electric valves each provided with an anode, a cathode, and a control grid, a grid excitation circuit for each of certain of said valves comprising a grid transformer provided with a primary winding energized in accordance with the anode potential of the corresponding valve to maintain said valve normally in a predetermined state of conductivity and means for independently exciting said transformer to change periodically the conductive state of said valve.

4. In an electric valve converting apparatus for transmitting energy from a source of current through a plurality of electric valves each provided with an anode, a cathode, and a control grid, a grid excitation circuit for each of certain of said valves comprising a potential divider connected between the anode and cathode of the corresponding valve, a grid transformer provided with a primary winding energized from said potential divider to maintain said valve normally in a predetermined state of conductivity, and means for independently exciting said grid transformer to change periodically the conductive state of said valve.

5. In an electric valve converting apparatus for transmitting energy from a source of current through a plurality of electric valves each provided with an anode, a cathode and a control grid, a grid excitation circuit for each of certain of said valves comprising means for impressing on the grid a potential dependent upon the instantaneous anode potential of the corresponding valve but of opposite polarity to maintain said valve normally non-conductive, and means for periodically overcoming said grid potential to render said valve conductive.

6. In an electric valve converting apparatus for transmitting energy from a source of current through a plurality of electric valves each provided with an anode, a cathode, and a control grid, a grid excitation circuit for each of certain of said valves comprising a potential divider connected between the anode and cathode of the corresponding valve, a grid transformer provided with a primary winding energized from said potential divider, the connections being such that the grid and anode potentials are of opposite polarity to maintain said valve normally non-conductive, and means for periodically overcoming said grid potential to render said valve conductive.

7. In an electric valve converting apparatus for transmitting energy from a source of current through a plurality of electric valves each provided with an anode, a cathode, and a control grid, a grid excitation circuit for each of certain of said valves comprising means for impressing on the grid a potential dependent upon the instantaneous anode potential of the corresponding valve to maintain said valve normally in a predetermined state of conductivity and an independent source of grid potential of a frequency equal to that at which it is desired to commutate the current between said valves for periodically changing the conductive state of said valve.

8. In an electric valve converting apparatus for transmitting energy from a source of current through a plurality of electric valves each provided with an anode, a cathode, and a control grid, a grid excitation circuit for each of certain of said valves comprising means for impressing on the grid a potential dependent upon the instantaneous anode potential of the corresponding valve to maintain said valve normally in a predetermined state of conductivity, an independent source of grid potential, and commutator means for periodically connecting said source of grid potential in said excitation circuit to change the conductive state of said valve.

9. In an electric valve converting apparatus for transmitting energy from a source of alternating current through a plurality of electric valves each provided with an anode, a cathode, and a control grid, a grid excitation circuit for each of certain of said valves comprising means for impressing on the grid a potential dependent upon the instantaneous anode potential of the corresponding valve to maintain said valve normally in a predetermined state of conductivity, a source of alternating potential synchronous with that of said source of current, and commutator means for periodically impressing said alternating potential on said grid to change the conductive state of said valve.

10. In an electric valve converting apparatus for transmitting energy from a source of alternating current through a plurality of electric valves each provided with an anode, a cathode, and a control grid, a grid excitation circuit for each of certain of said valves comprising means for impressing on the grid a potential dependent upon the instantaneous anode potential of the corresponding valve to maintain said valve normally in a predetermined state of conductivity, a source of alternating potential synchronous with that of said source of current, commutator means for periodically impressing said alternating potential on said grid to change the conductive state of said valve, and means for varying the phase relation of said alternating potential with respect to that of said source to control the energy transmitted by said apparatus.

11. In combination, a source of current, a load circuit, means for transmitting energy from said source to said load circuit including a plurality of electric valves each provided with an anode, a cathode, and a control grid, a grid excitation circuit for each of said valves comprising means for impressing on the grid a potential dependent upon the instantaneous anode potential of the corresponding valve to maintain said valve normally in a predetermined state of conductivity, and means for periodically overcoming said grid potential to change the conductive state of said valve.

12. In combination, a source of current, a dynamo-electric machine, means for transmitting energy from said source to said machine including a plurality of electric valves each provided with an anode, a cathode and a control grid, a grid excitation circuit for each of said valves comprising means for impressing on the grid a potential dependent upon the instantaneous anode potential of the corresponding valve to maintain said valve normally in a predetermined state of conductivity, and a commutator means driven by said machine for periodically impressing a potential on said grid to change the state of conductivity of said valve.

13. In combination, a source of alternating current, a dynamo-electric machine, means for transmitting energy from said source to said machine including a plurality of electric valves each provided with an anode, a cathode, and a control grid, a grid excitation circuit for each of said valves comprising means for impressing on the grid a potential dependent upon the instantaneous anode potential of the corresponding valve but of opposite polarity to maintain said valve normally non-conductive, an alternating potential derived from said source, commutator means driven by said machine for periodically impressing said alternating potential on said grid to render said valve conductive, and means for varying the phase of said alternating potential to control the energy transmitted to said machine.

14. In an electric valve converting apparatus for transmitting energy from a source of current through a plurality of electric valves each provided with an anode, a cathode, and a control grid, a grid excitation circuit for each of certain of said valves comprising a grid transformer provided with a winding energized in accordance with the anode potential of the corresponding valve to maintain said valve normally in a predetermined state of conductivity, an independent source of potential of a frequency which it is desired to commutate the current between said valves, and a second winding for said grid transformer energized from said independent source to periodically change the conductive state of said valve.

15. In an electric valve converting apparatus for transmitting energy from a source of current through a plurality of electric valves each provided with an anode, a cathode, and a control grid, a grid excitation circuit for each of certain of said valves comprising a grid transformer provided with a winding energized in accordance with the anode potential of the corresponding valve to maintain said valve normally in a predetermined state of conductivity, an independent source of potential, a second winding for said grid transformer, and commutator means for periodically energizing said winding from said independent source to periodically change the conductive state of said valve.

16. In an electric valve converting apparatus for transmitting energy from a source of current through a plurality of electric valves each provided with an anode, a cathode, and a control grid, a grid excitation circuit for each of certain of said valves comprising a grid transformer provided with a winding energized in accordance with the anode potential of the corresponding valve to maintain said valve normally in a predetermined state of conductivity, an independent source of potential, a resistor, commutator means for periodically connecting said resistor across said source, and a second winding for said grid transformer energized with the potential across said resistor.

17. In an electric valve converting apparatus for transmitting energy from a source of current through an electric valve provided with an anode, a cathode, and a control grid, a grid excitation circuit for said valve including an inductive winding, a source of grid potential, commutating means for periodically impressing said potential on said grid through said winding, and means interposed between said commutating means and said inductive winding for suppressing from said grid positive potential impulses resulting from the interruption of current in said excitation circuit by said commutating means.

18. In an electric valve converting apparatus for transmitting energy from a source of current through an electric valve provided with an anode, a cathode, and a control grid, a grid excitation circuit for said valve including a grid transformer, a source of alternating grid potential, commutating means for periodically impressing said potential on said grid through said transformer, and means for preventing the interruption of current in the excitation circuit by said commutator during the negative half cycles of said alternating grid potential.

19. In an electric valve converting apparatus for transmitting energy from a source of current through an electric valve provided with an anode, a cathode, and a control grid, a grid excitation circuit for said valve including a grid transformer, a source of alternating grid potential, commutating means for periodically impressing said potential on said grid through said transformer, and rectifying means interposed between said commutator and said transformer and connected to suppress the negative half cycles of said alternating potential.

20. In an electric valve converting apparatus for transmitting energy from a source of current through a plurality of electric valves each provided with an anode, a cathode, and a control grid, a grid excitation circuit for each of certain of said valves comprising an inductive winding, means for impressing on the grid a potential dependent upon the instantaneous anode potential of the corresponding valve to maintain said valve normally in a predetermined state of conductivity, an independent source of grid potential, commutating means for periodically impressing said independent source of potential on said grid through said inductive winding, and means for preventing the interruption of current in said excitation circuit by said commutator during the negative half cycles of said alternating grid potential.

21. In combination, a source of alternating current, a dynamo-electric machine, means for energizing said machine from said source including a plurality of electric valves each provided with an anode, a cathode, and a control grid, a grid excitation circuit for each of said valves comprising a grid transformer provided with a winding energized with the anode potential of the corresponding valve but of opposite polarity to maintain said valve normally non-conductive, an alternating potential derived from said source, commutator means driven by said machine for periodically impressing said alternating potential on said grid transformer to render said valve conductive, and rectifying means interposed between said commutator means and said transformer to suppress the negative half cycles of said alternating potential.

ERNST F. W. ALEXANDERSON.
ALBERT H. MITTAG.
EARL L. PHILLIPI.